June 5, 1956  R. C. ROGERS  2,748,679
ROTARY VINEYARD HOES
Filed Nov. 25, 1953  2 Sheets-Sheet 2
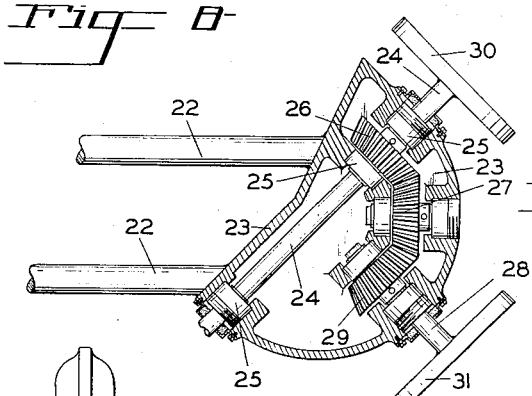
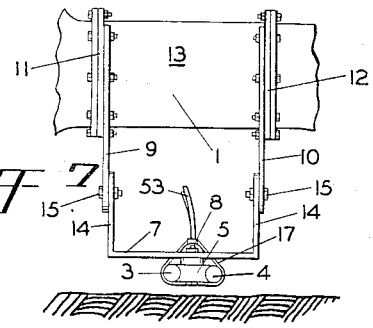
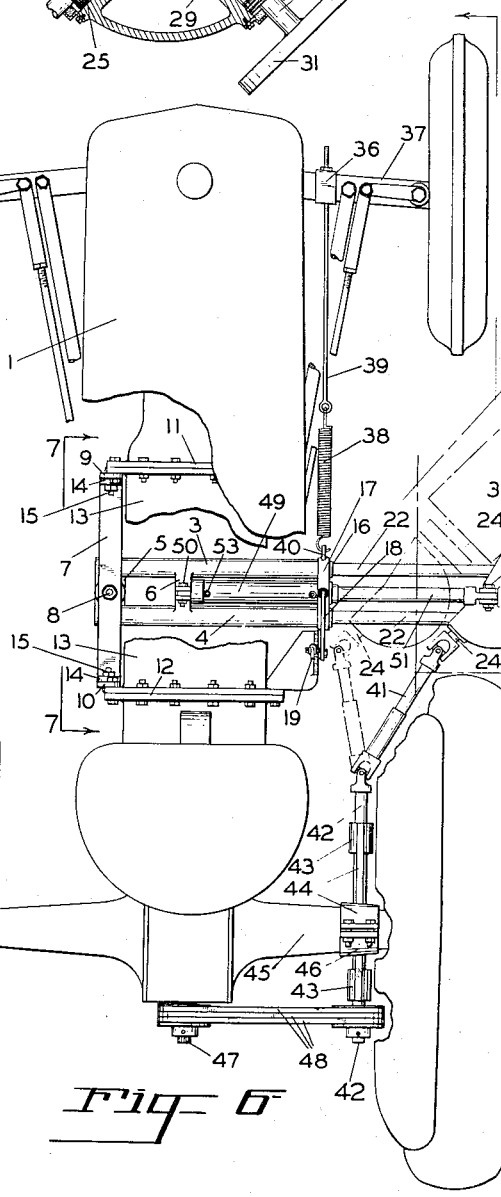
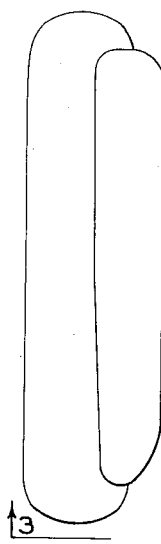
INVENTOR.
ROY C. ROGERS
BY
Kimmel & Crowell
ATTORNEYS

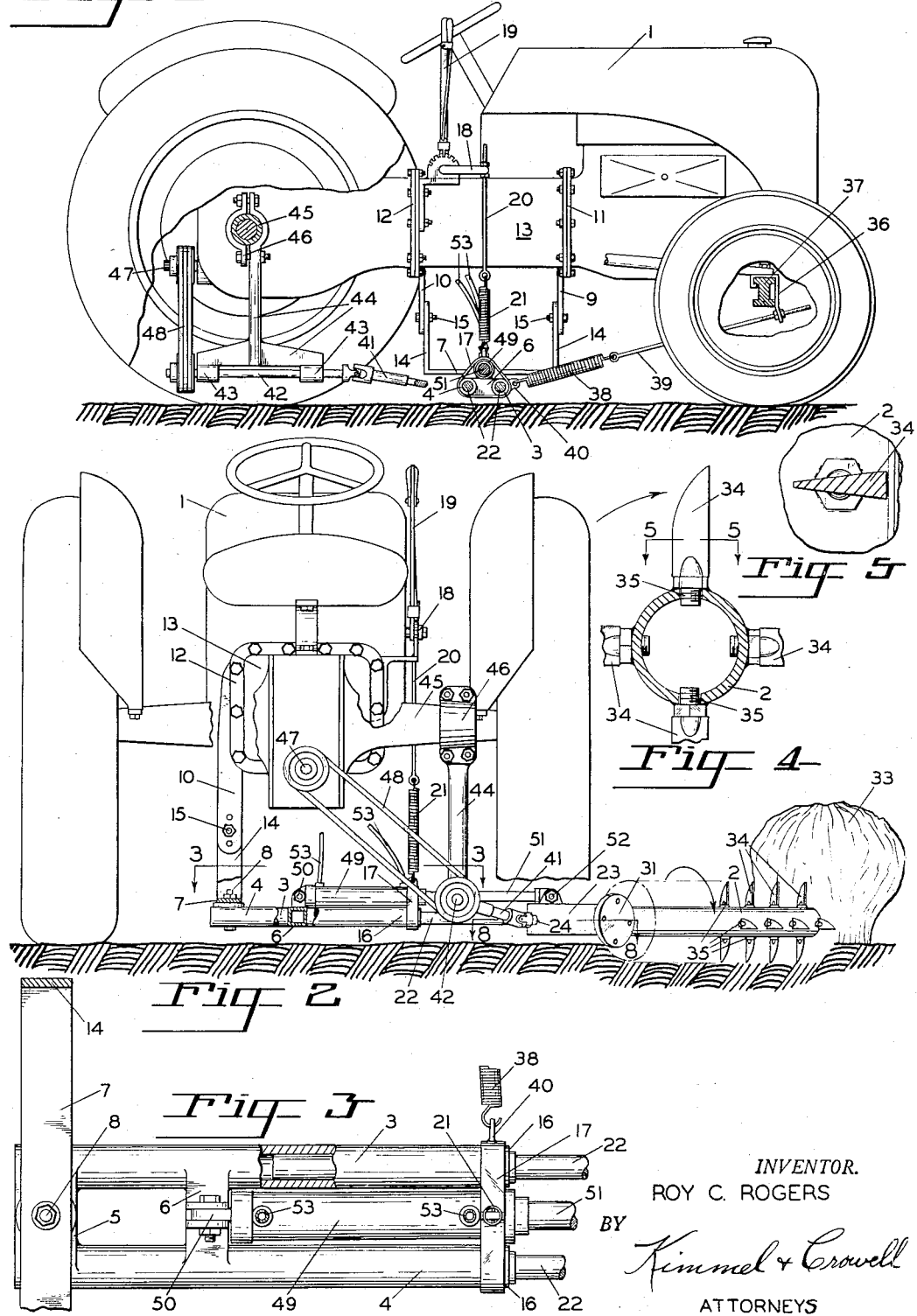

United States Patent Office 2,748,679
Patented June 5, 1956

2,748,679

ROTARY VINEYARD HOES

Roy C. Rogers, Ridgefield, Wash.

Application November 25, 1953, Serial No. 394,357

1 Claim. (Cl. 97—37)

This invention relates to rotary vineyard hoes and is particularly adapted to be used to cultivate berry bushes and the like.

With my new and improved rotary vineyard hoe, the dirt and weeds can be removed from between the bushes by a rotary drum carrying a series of cutting teeth and by a simple interchange of parts can be adapted to bank up or fill in the dirt between the bushes.

My new and improved rotary hoe is readily attached or detached from a standard tractor employing the hydraulic fluid generated by the tractor for operating the same, together with the power take off mechanism of the tractor, requiring no other power means.

These and other incidental objects will be apparent in the drawings, specification and claim.

Referring to the drawings:

Figure 1 is a side elevation of a tractor showing part of my new and improved rotary vineyard hoe mounted thereon. This view is taken on line 1—1 of Figure 6, looking in the direction indicated, parts broken away for convenience of illustration.

Figure 2 is a rear view of the tractor and the hoe, parts broken away for convenience of illustration.

Figure 3 is a fragmentary plan view of the mechanism for supporting the rotary hoe, taken on line 3—3 of Figure 2.

Figure 4 is a sectional view, taken through the rotor illustrating how the cultivating teeth are secured thereto.

Figure 5 is a fragmentary view, taken on line 5—5 of Figure 4 through one of the cultivating teeth.

Figure 6 is a plan view of a tractor having my new and improved rotary cultivating hoe mounted thereto, parts of the tractor being broken away for convenience of illustration.

Figure 7 is a fragmentary side view of the tractor body, illustrating how my new and improved rotary hoe framework is mounted to the tractor, taken on line 7—7 of Figure 6.

Figure 8 is a plan sectional view of the framework for supporting the rotary cultivator head. This view particularly illustrates how the rotor is driven.

Referring more specifically to the drawings:

I have illustrated a conventional tractor 1 having my rotary cultivating drum 2 mounted thereto. The framework for mounting the rotor 2 to the tractor consists of a pair of guideways 3 and 4. These guideways are secured together by the cross framework 5 and 6, referring particularly to Figures 2 and 3. One end of the guideways 3 and 4 are pivotally connected to the horizontally disposed frame 7 by the king pin 8. Brackets 9 and 10 are fixedly secured to the flanges 11 and 12, forming part of the body 13 of the tractor.

The horizontal frame 7 has upturned arms 14 which are adjustably and pivotally mounted at 15 to the brackets 9 and 10, referring particularly to Figures 2, 3, 6 and 7. The brackets 9 and 10 may be mounted by any other suitable method to the tractor and will vary with different makes of tractors. The opposite ends 16 of the guideways 3 and 4 are embraced by the band 17, or any other suitable structure. The outer ends 16 of the said guides are supported from the crank 18 forming part of the lever 19 by way of the rod 20 and the spring 21. The lever 19 will determine the depth that the rotor 2 will enter the ground.

Plungers 22 are adapted to operate within the guideways 3 and 4 at their one end and are fixedly secured to the gear box housing 23 at their opposite end. These plungers 22 through the guideways 3 and 4 support the rotor 2 by way of the housing 23 to the desired elevation by the above described lever connection.

A drive shaft 24 is journalled within the bearing 25 within the housing 23. A bevelled gear 26 is keyed to the said shaft. This bevel gear drives the intermediate idler gear 27, which in turn drives the shaft 28 by way of the bevel gear 29, referring particularly to Figure 8. A flange 30 forms part of the shaft 24 while the flange 31 forms part of the shaft 28. A flange 32 is formed on the inner end of the rotary drum 2 and is adapted to be bolted to either the flange 30 or the flange 31. In the drawings I illustrate the same being connected to the flange 30. This positions the rotor 2 as illustrated in the drawings by the full lines, and rotates the same in a direction to move the dirt from between the plants 33. When the same is bolted to the flange 31, it will take the broken line position as illustrated in Figure 6. This will rotate the drum 2 in such a direction as to move the dirt in between the plants. Cutting teeth 34 are threadably connected to the drum 2 at 35, referring particularly to Figures 4 and 5, making it easy to remove the said teeth from the drum for replacing.

The guideways 3 and 4 are held in the position as best shown in Figure 6 by the bracket 36 secured to the front axle 37 of the tractor by way of the spring 38 and the adjustable connecting rod 39. The spring is connected to the connecting band 17 at 40. The spring 38 provides a means of allowing the guideways 3 and 4 to pivot about the king pin 8 until the drum 2 is released from any obstructions encountered while cultivating.

The shaft 24 is driven by the telescopical universal shaft 41 from the shaft 42, which is journalled within the bearings 43 of the bracket 44, which is fixedly secured to the axle 45 of the tractor 1 by the clamp 46. The shaft 42 is driven from the power take-off shaft 47 of the tractor through the belts 48, as best illustrated in Figures 1, 2 and 6.

The extended position of the rotary cultivator drum 2 is determined by the hydraulic cylinder 49, which is pivotally mounted at 50 to the cross frame 6 of the guideways 3 and 4 at its one end, and having its piston rod 51 pivotally connected to the gear housing 23 at 52. Hydraulic hose lines 53 are shown broken away, as I have not attempted to show the control lever which would be associated with the hydraulic pump mounted on the tractor 7.

I will now describe the operation of my new and improved rotary vineyard hoe. When the dirt is to be removed from between the plants 33, the cultivating cylinder 2 is moved to the full line position as illustrated in Figures 2 and 6 by the action of the hydraulic cylinder 49 forcing the plungers 22 to the right or away from the guideways 3 and 4, still remaining within the guides.

The lever 49 is adjusted so as to raise or lower the rotor 2 to the desired elevation, pivoting the guideways 3 and 4 and the horizontal frame 7 about the pivot point 15 associated with the brackets 9 and 10. The power take off 47 of the tractor will then drive the rotor 2 in the direction of the arrows, cultivating the soil away from between the plants. The power take off 47 of the tractor driving the belts 48, shaft 42, telescopical drive shaft 41, thence the shaft 24 within the housing 23 revolving the rotor at a relatively high rate of speed.

When the tip of the rotor reaches the plant a hydraulic valve will be operated by the operator, which will pull the piston rod 51 towards the guideways 3 and 4, together with the housing 23, to the broken line position shown in Figure 6. After the plant is passed the valve is operated in the opposite direction, pushing the piston rod 51 outwardly from the guideways 3 and 4, repositioning the rotor cultivator 2 on a line between the plants.

When it is desired to replace the dirt between the plants, the rotor drum 2 is secured to the flange 31 of the shaft 28 as indicated by broken lines in Figure 6. This will throw the dirt from between the rows of plants to the position between the plants.

In the event that an obstruction is encountered by the cultivating rotor 2, the spring 38 will permit the guideways 3 and 4 together with the housing 23 to pivot about the king pin 8 of the supporting bracket 7. The telescopic drive shaft 41 will also come into operation allowing the drum to remain stationary giving the operator time to stop the tractor or withdraw the drum by the action of the hydraulic cylinder 49.

What is claimed is:

A rotary hoe comprising a substantially U-shaped bracket having the arms thereof fixedly pivotally mounted on a tractor body and having the bight portion thereof normally horizontally disposed, a frame structure comprising a pair of spaced hollow tubular members fixedly secured together in a side-by-side relation, means pivotally connecting one pair of adjacent ends of said tubular members to said bight whereby said frame may be selectively moved horizontally on said bight, manually operated lever means mounted on said tractor and connected with said frame structure for pivoting said bracket and said frame structure vertically, an elongated rod telescopically mounted in each of said tubular members, a gear box housing mounted on the outer ends of said rods, a pair of driven shafts mounted in said housing, a drive shaft mounted in said housing, gear means connecting said driven and drive shafts, said driven shafts each having a flange on their respective outer ends and said driven shafts being disposed at an angle to each other, an elongated rotary hoe having a flange at one end thereof for selective connection with one of said pair of flanges, hydraulic means mounted on said frame structure and connected with said housing whereby said housing may be moved toward or away from said frame structure, and driving means connected with said drive shaft.

References Cited in the file of this patent

UNITED STATES PATENTS

| | | |
|---|---|---|
| 2,539,174 | Baideme et al. | Jan. 23, 1951 |
| 2,590,537 | Holmes | Mar. 25, 1952 |
| 2,665,621 | Smith et al. | Jan. 12, 1954 |

FOREIGN PATENTS

| | | |
|---|---|---|
| 663,494 | Great Britain | Dec. 19, 1951 |